United States Patent
Chen

(10) Patent No.: US 11,528,379 B2
(45) Date of Patent: *Dec. 13, 2022

(54) MULTI-MODE SCANNING DEVICE PERFORMING FLATBED SCANNING

(71) Applicant: AVISION INC., Hsinchu (TW)

(72) Inventor: Yen-Cheng Chen, Baoshan Township, Hsinchu County (TW)

(73) Assignee: AVISION INC., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/491,996

(22) Filed: Oct. 1, 2021

(65) Prior Publication Data

US 2022/0124211 A1    Apr. 21, 2022

(30) Foreign Application Priority Data

Oct. 16, 2020   (TW) .................................. 109135939

(51) Int. Cl.
*H04N 1/00* (2006.01)
*H04N 1/10* (2006.01)
*H04N 1/12* (2006.01)

(52) U.S. Cl.
CPC ..... *H04N 1/00753* (2013.01); *H04N 1/00087* (2013.01); *H04N 1/1061* (2013.01); *H04N 1/12* (2013.01)

(58) Field of Classification Search
CPC ................................................ H04N 1/00753
USPC ........................................................ 358/474
See application file for complete search history.

(56) References Cited

U.S. PATENT DOCUMENTS

| 6,944,355 B2 * | 9/2005 | Lupien, Jr. ............. H04N 1/387 358/3.26 |
| 2012/0287482 A1 | 11/2012 | Sakai et al. |
| 2016/0100075 A1 * | 4/2016 | Chen ........................ H04N 1/04 358/1.13 |
| 2022/0124204 A1 * | 4/2022 | Chen .................. H04N 1/00005 |
| 2022/0124219 A1 * | 4/2022 | Chen .................. H04N 1/00748 |

FOREIGN PATENT DOCUMENTS

| CN | 102780829 A | 11/2012 |
| CN | 103997587 A | 8/2014 |
| TW | 580824 B | 3/2004 |

* cited by examiner

*Primary Examiner* — Jacky X Zheng
(74) *Attorney, Agent, or Firm* — Muncy, Geissler, Olds & Lowe, P.C.

(57) ABSTRACT

A multi-mode scanning device includes a background element, a transparent platen, first and second light sources and an optical module. The first light source outputs visible light to irradiate the background element and an original on the transparent platen to generate first and second light, respectively. The second light source outputs invisible light to irradiate a combination of the background element and the original to generate third and fourth light. The movable optical module receives the first to fourth light and generates sensing signals, and obtains visible light information and invisible light information representative of the original according to the sensing signals. The original is disposed between the background element and the optical module. The first light source and the optical module are disposed on a same side of the background element. The optical module and the second light source are disposed on different sides of the background element.

14 Claims, 8 Drawing Sheets

MULTI-MODE SCANNING DEVICE PERFORMING FLATBED SCANNING

CROSS-REFERENCE TO RELATED APPLICATIONS

This application claims priority of No. 109135939 filed in Taiwan R.O.C. on Oct. 16, 2020 under 35 USC 119, the entire content of which is hereby incorporated by reference.

BACKGROUND OF THE INVENTION

Field of the Invention

This disclosure relates to a multi-mode scanning device performing flatbed scanning, and more particularly to a multi-mode scanning device using a background element for transmitting invisible light and reflecting visible light to perform flatbed scanning.

Description of the Related Art

After a conventional scanner has scanned a document with holes to obtain a visible light image, the visible light image has fully black portions corresponding to the holes. If the user wants to print out this image, a lot of toner may be wasted in printing the fully black hole portions of the image. At present, the copier on the market directly prints out the fully black hole portions of the image. Although the hole portions may be removed using the image processing software, such the processing is not very precise and occupies a lot of performance to waste the user's time, and hinders the users, who are not unfamiliar with the computer, from using the image processing software.

On the other hand, although a preview scan can be performed to set the scanning boundary and prevent the hole portions or broken portions, the information beside the hole may not be scanned. Thus, the scan result is incomplete, and such the operation method becomes very complicated.

At present, the user's requirements on the functions of the scanner or multi-function peripheral gradually increase. So, how to provide a scanning device having the functions of scanning the visible light image of the document, obtaining the contour information, and even inpainting the image with holes is really a problem to be solved by this disclosure.

BRIEF SUMMARY OF THE INVENTION

It is therefore an objective of this disclosure to provide a multi-mode scanning device performing flatbed scanning to possess functions of scanning a visible light image of a document, obtaining invisible light (contour) information using a calibration member, which is necessary for the scanning of the visible light image, in conjunction with an invisible light source, and even inpainting an image of a hole or images of holes.

To achieve the above-identified object, this disclosure provides a multi-mode scanning device for scanning an original. The multi-mode scanning device includes a background element, a transparent platen, a first light source, a second light source and an optical module. The transparent platen supports the original such that the original is disposed between the transparent platen and the background element. The first light source outputs visible light to irradiate the background element and the original to generate first light and second light, respectively. The second light source outputs invisible light to irradiate a combination of the background element and the original to generate third light and fourth light. The optical module is movably disposed, and receives the first light, the second light, the third light and the fourth light to generate sensing signals, and thus to obtain visible light information and invisible light information representative of the original according to the sensing signals. The original is disposed between the background element and the optical module. The first light source and the optical module are disposed on a same side of the background element. The optical module and the second light source are disposed on different sides of the background element.

With the above-mentioned embodiment, it is possible to provide a multi-mode scanning device performing flatbed scanning to possess the functions of scanning the visible light image of the document, obtaining the invisible light (contour) information using the calibration member, which is necessary for the visible light image, in conjunction with the invisible light source, and even inpainting the image of the hole or the images of the holes. This disclosure adopts the background element to provide the background reference function and the contour information acquiring function. The background element transmits the invisible light and reflects the visible light. This is advantageous to the technological development of image scanning and image inpainting.

Further scope of the applicability of this disclosure will become apparent from the detailed description given hereinafter. However, it should be understood that the detailed description and specific examples, while indicating preferred embodiments of this disclosure, are given by way of illustration only, since various changes and modifications within the spirit and scope of this disclosure will become apparent to those skilled in the art from this detailed description.

DETAILED DESCRIPTION OF THE INVENTION

The following structures of all examples can be appropriately combined, replaced and modified to achieve the effects of this disclosure.

At present, the user's requirements on functions of scanners or multi-function peripherals gradually increase, and the user wishes to obtain the visible light image of the document using an ordinary scanner or multi-function peripheral to preferably inpaint the hole image, or even to obtain the contour information of the document.

Figure 1A:
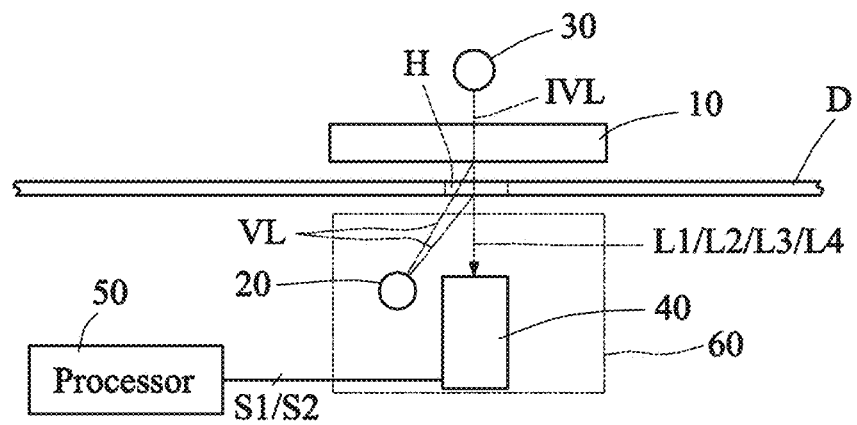
FIG. 1A is a schematic view showing a scanning device according to a preferred embodiment of this disclosure.
Figure 1B:
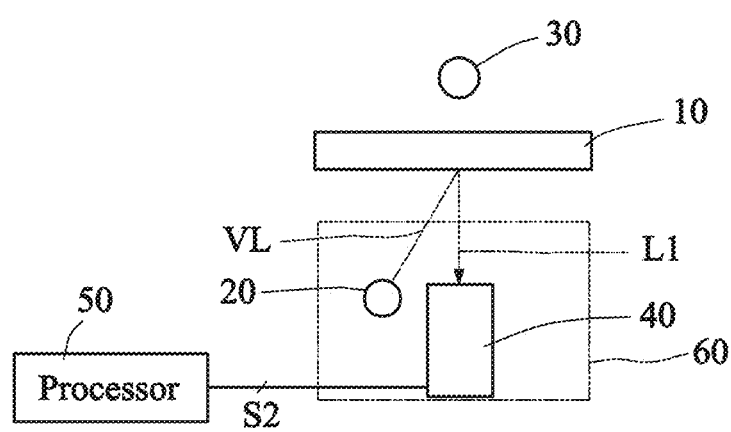
FIG. 1B is a schematic view showing the scanning device of FIG. 1A performing visible light image scanning.
Figure 1C:
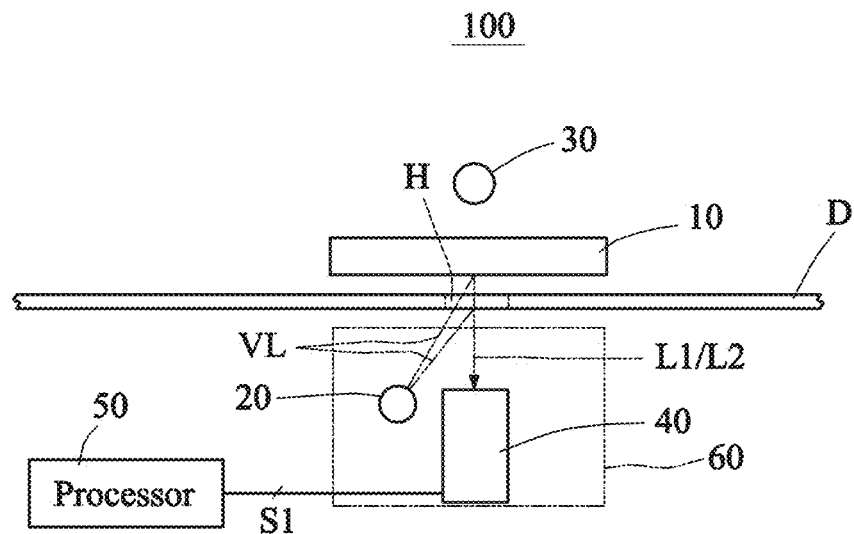
FIG. 1C is a schematic view showing the scanning device of FIG. 1A performing visible light calibration.
Figure 1D:
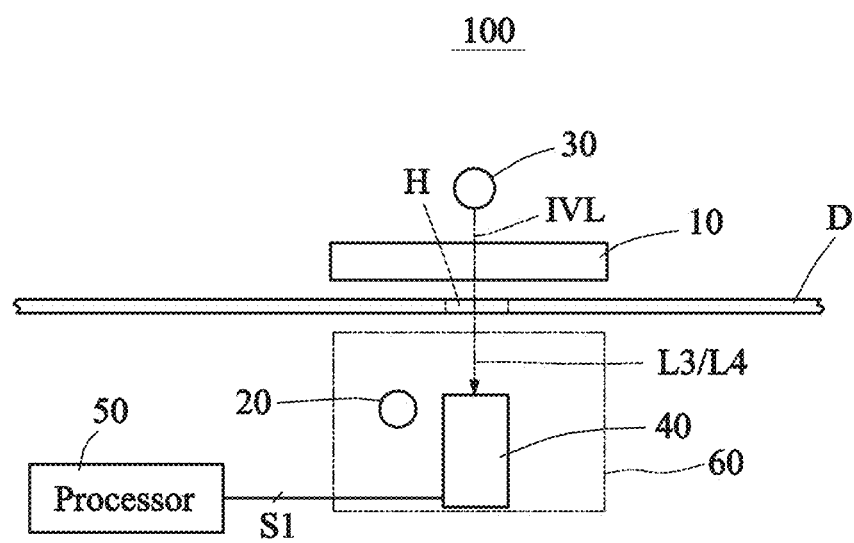
FIG. 1D is a schematic view showing the scanning device of FIG. 1A performing invisible light image scanning.

FIG. 1A is a schematic view showing a scanning device according to a preferred embodiment of this disclosure. FIGS. 1B to 1D are schematic views showing the scanning device of FIG. 1A performing visible light image scanning, visible light calibration and invisible light image scanning. Because various modes of visible light scanning and invisible light scanning can be performed, the scanning device of this embodiment may be referred to as a multi-mode scanning device. Referring to FIGS. 1A to 1D, a multi-mode scanning device 100 for scanning an original D includes a background element 10, a first light source 20, a second light source 30 and an optical module 40. The background element 10 is a non-transparent element, which may also be referred to as a reference member and is defined with respect to the visible light for the human eyes, and the visible light can penetrate through the transparent element. The architecture is applicable to both the sheet-fed scanning and flatbed scanning of the original. It is worth noting that two glass substrates may be provided on an upper side and a lower side of the original D, respectively, to protect the background element 10 and the optical module 40 from being contaminated by the foreign objects brought by the original D. In the sheet-fed scanner, the non-transparent element is a calibration sheet with respect to the transparent glass substrate, and the non-transparent element may have any color. In the flatbed scanner, the background element is a background sheet.

The background element 10 is disposed opposite the optical module 40. The first light source 20 outputs visible light VL to irradiate the background element 10 and the original D to generate first light L1 and second light L2, respectively. The second light source 30 outputs invisible light IVL to irradiate a combination of the background element 10 and the original D to generate third light L3 and fourth light L4. The optical module 40 receives the first light L1, the second light L2, the third light L3 and the fourth light L4 to generate sensing signals S1. Thus, visible light information representative of the original D and invisible light information representative of a high-contrast contour of the original D are obtained according to the sensing signals S1. In this embodiment, the original D is disposed between the background element 10 and the optical module 40, and the first light source 20 and the optical module 40 are disposed on the same side of the background element 10.

According to the above-mentioned architecture, the effects of this disclosure can be achieved, so that the function of scanning the visible light image of the document can be obtained, and the contour information can be obtained using a calibration member, which is necessary for the scanning of the visible light image, in conjunction with the invisible light source, or even the image of the hole can be inpainted according to the contour information. The above-mentioned scanning device is different from the conventional film scanner having the defect inpainting function because the film scanner is a dedicated device having no background element serving as the background of the invisible light or allowing the invisible light to penetrate therethrough.

Upon scanning, it is worth noting that the visible light source and the invisible light source may be concurrently turned on to let visible light receiving units and invisible light receiving units of the optical module 40 obtain visible light and invisible light signals in a time-sharing manner; or the visible light source and the invisible light source may be turned on in the time-sharing manner to perform the time-sharing scan.

The multi-mode scanning device 100 may further include a processor 50. In a calibration mode, the background element 10 functions as the calibration sheet. The first light source 20 outputs the visible light VL to irradiate the background element 10 to generate the first light L1 (see FIG. 1B), the optical module 40 receives the first light L1 to generate a calibration signal S2, and the processor 50 performs the optical calibration according to the calibration signal S2. That is, the processor 50 performs the standard white (standard color) optical calibration (including the brightness calibration) using the background element 10. In one example, inpainting the image of the hole and obtaining the contour information of the document are performed in the processor 50. In another example, inpainting the image of the hole and obtaining the contour information of the document are performed in a computer, a peripheral or a server (not shown) connected to the multi-mode scanning device 100.

For the sake of explanation, the first light L1 and the second light L2 are firstly defined. The visible light VL passes through a hole H of the original D to irradiate the background element 10 to generate the first light L1 (see FIG. 1A or 1C). That is, the visible light VL directly irradiates the background element 10, and is then reflected by the background element 10 to generate the first light L1. In the calibration mode, no original D is present, and the first light L1 (see FIG. 1B) is also generated. In the condition when the original D is present, the visible light VL directly penetrates through the hole H to irradiate the background element 10, and the first light L1 (see FIG. 1C) is also generated. On the other hand, when the original D is present, the visible light VL irradiates the portion of the original D (hole-free portion or physical portion) other than the hole H to generate the second light L2. That is, the visible light VL is reflected by the original D to generate the second light L2 (see FIG. 1C). It is worth noting that when the original D has the higher transmission rate, the visible light VL may penetrate through the original D and reflected by the background element 10, and then penetrate through the original to generate the light, which may also be referred to as the second light L2.

Referring to FIGS. 1A and 1D, the second light source 30 and the optical module 40 are disposed on two sides of the background element 10, and the invisible light IVL penetrates through a combination of the background element 10 and the original D to generate the third light L3 and the fourth light L4. The invisible light IVL sequentially penetrates through the background element 10 and the hole H of the original D to generate the fourth light L4. Because the hole H is fully transparent, the hole H cannot block any invisible light IVL, and the intensity of the invisible light IVL is only decreased by the background element 10. On the other hand, the invisible light IVL sequentially penetrates through the background element 10 and the physical portion of the original D to generate the third light L3, and the intensity of the invisible light IVL is decreased by the background element 10 and further decreased by the original D. Thus, the information of the hole H can be clearly obtained, and the contour information of the original D may be obtained at the same time. The invisible light IVL includes, for example but without limitation to, an ultraviolet ray, infrared, far infrared and the like. In FIG. 1A, the combination of the first light source 20 and the optical module 40 may be referred to as a scanning module 60.

Figure 2:
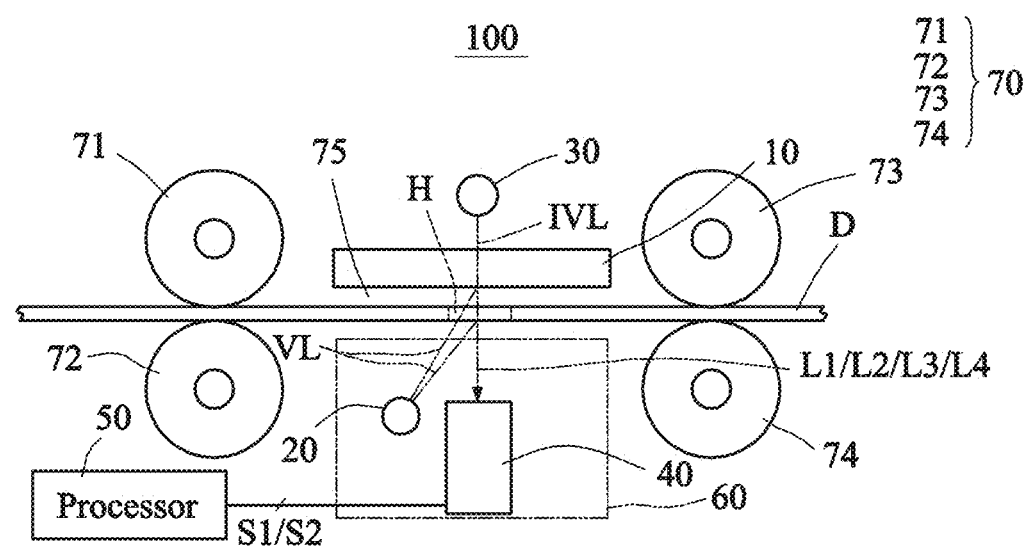
FIG. 2 is a schematic view showing a scanning device of a first modified example of FIG. 1A.

FIG. 2 is a schematic view showing a scanning device of a first modified example of FIG. 1A. Referring to FIG. 2, the multi-mode scanning device 100 further includes a transporting mechanism 70 for transporting the original D past a sheet passage 75 between the background element 10 and the optical module 40. The transporting mechanism 70 includes rollers 71, 72, 73 and 74. Thus, the sheet-fed original scanning can be achieved.

Figure 3A:
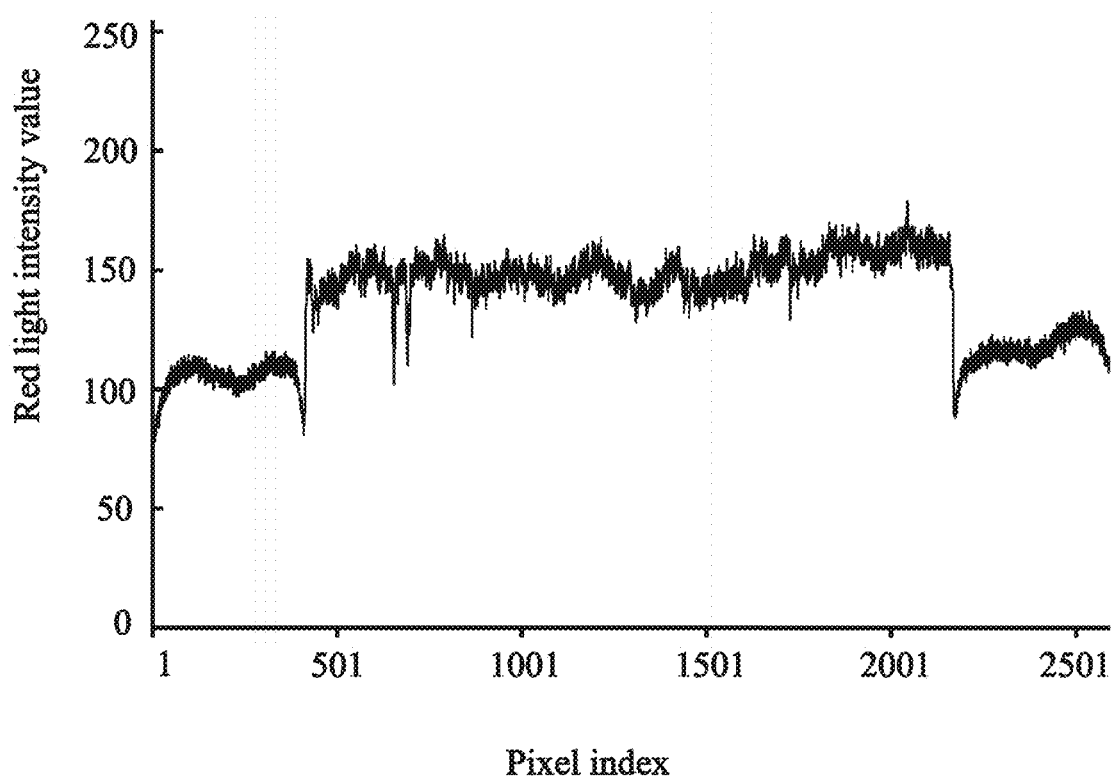
FIGS. 3A to 3C are graphs showing a pixel index of the scanning device of FIG. 2 for scanning an original versus red, green and infrared light intensity values.
Figure 3B:
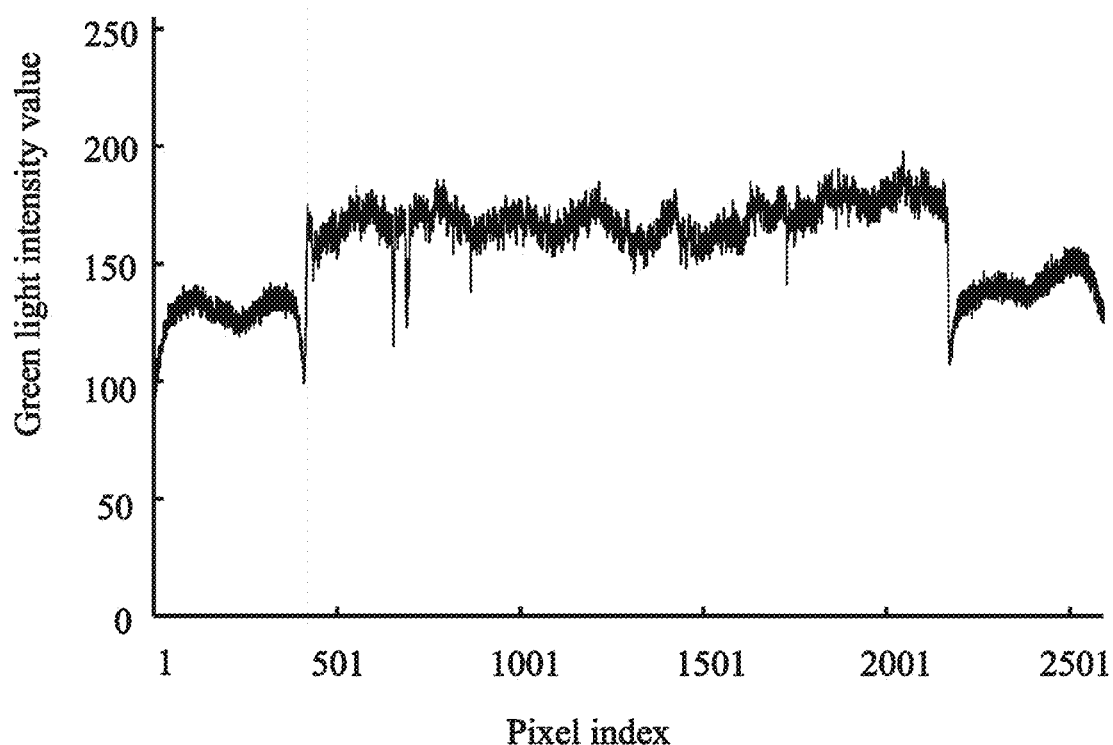
Figure 3C:
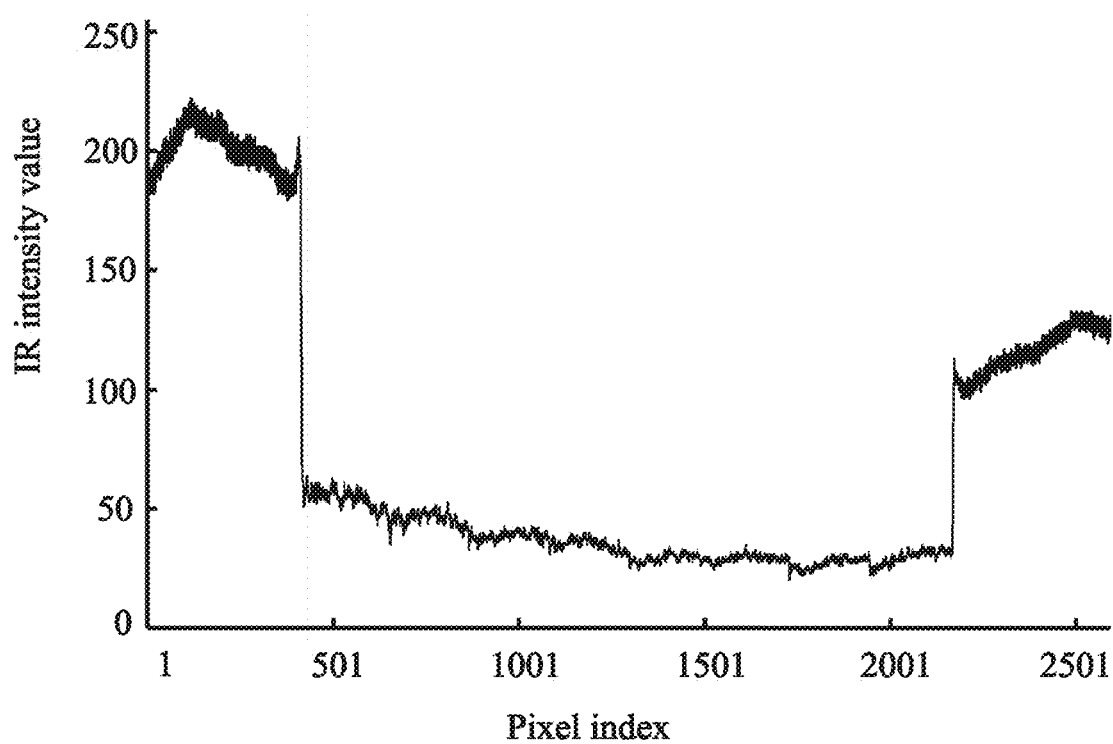

FIGS. 3A to 3C are graphs showing a pixel index of the scanning device of FIG. 2 for scanning an original versus red, green and infrared light intensity values. Referring to FIGS. 3A to 3C, the horizontal axis denotes the pixel index of each of the red, green and infrared (IR) sensing pixels, wherein the pixel index represents the number (from 1 to 2592) of the sensing pixel of the image sensor of the optical module 40. The image sensor may be a charge-coupled device (CCD) type image sensor, or a contact image sensor (CIS). The vertical axes in FIGS. 3A to 3C respectively represent the intensity values of the red, green and infrared (IR) light. The curve of FIG. 3A represents the result of the red sensing pixel, the curve of FIG. 3B represents the result of the green sensing pixel, and the curve of FIG. 3C represents the result of the IR sensing pixel. The distribution of the original ranges from the pixel index of about 400 to the pixel index of about 2170. It is worth noting that because one row of infrared sensing pixels is combined with one CIS having three rows of red, green and blue sensing pixels in the test stage, there may be some errors in the configuration location and angle, so that the results on the left and right sides may differ from each other. However, the sharp drop is present at the boundary (from the portion with the original to the portion without the original). According to the sensing results of the IR sensing pixels close to the left side in FIG. 3C, the processor 50 can determine the contour of the original D based on the relation chart of the invisible light intensity representative of the invisible light information versus the pixel index of the optical module 40, wherein a location where the invisible light intensity has the sharp drop along an axis of the pixel index represents the contour. For example, when viewed in the direction rightward from the pixel index of 400, the value of the sharp drop of the invisible light intensity of the invisible light sensing pixel at the pixel index of 400 ranges from about 110 to 180. Such the range for the sensitivity of the image sensor and the image processing is suitable for the determination of the contour of the original.

Alternatively, the processor 50 may also determine the contour of the original D according to the relation chart of both the visible light intensity representative of the visible light information and the invisible light intensity representative of the invisible light information versus the pixel index of the optical module 40, wherein a location where the invisible light intensity has the sharp drop along the axis of the pixel index and the visible light intensity has the sharp rise along the axis of the pixel index represents the contour. For example, the value of the sharp drop of the invisible light intensity has been explained hereinabove, the value of the sharp rise of the red visible light intensity ranges between about 40 and about 70, and the value of the sharp rise of the green visible light intensity ranges between about 30 and about 80. Thus, the difference between the value (negative value) of the sharp drop and the value (positive value) of the sharp rise, which is equal to the sum of the absolute values of the positive value and the negative value, can be set as ranging between 40 and 140. Such the range for the sensitivity of the image sensor and the image processing is also suitable for the determination of the contour of the original. Therefore, the value of the sharp drop of the IR intensity value is equal to about 1.5 to 5 times of the value of the sharp rise of the visible light intensity. If the determination is made according to only the value of the sharp rise of the visible light intensity, the determination may become difficult due to the sensing error. So, the determination made according to the value of the sharp drop of the IR intensity value has the special advantage.

Figure 4:
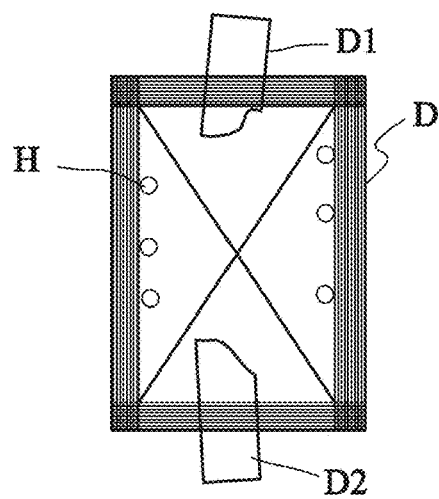
FIG. 4 is a schematic view showing the original.
Figure 5:
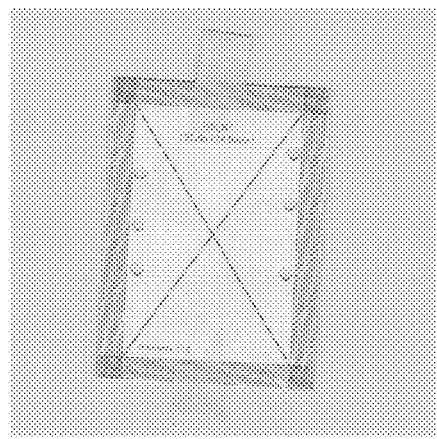
FIG. 5 shows a visible light image obtained after the original is scanned.
Figure 6:
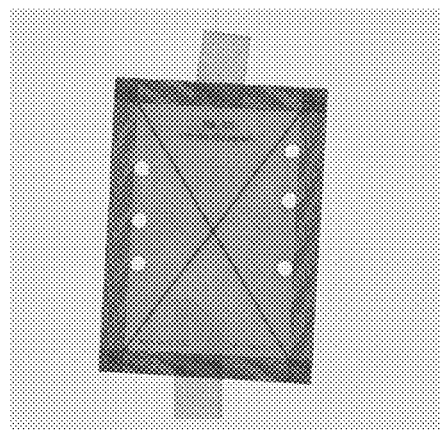
FIG. 6 shows an invisible light image obtained after the original is scanned.

FIG. 4 is a schematic view showing the original. Referring to FIG. 4, tapes D1 and D2 are adhered to the top side and the bottom side of the original D having holes H, and the periphery of the original D also has the straight-line pattern. The scanned results obtained using the scanning device of this disclosure are shown in FIGS. 5 and 6. FIG. 5 shows the visible light image obtained after the original is scanned, wherein the explanation is made according to the example of the sensing result of the green sensing pixels. FIG. 6 shows the invisible light image obtained after the original is scanned, wherein the explanation is made according to the example of the sensing result of the infrared sensing pixels, wherein the sensing result contains the intensity values converted into the gray-scale picture of the visible light. Compared FIG. 5 with 6, it is obtained that using the visible light to perform the contour detection may encounter some problems because the contrast between the background and the original is not high, and the upper side portion of the original tends to have shadows (FIG. 5). On the other hand, using the invisible light to perform the contour detection is easier because the contrast between the original and the background is higher and suitable for the image processing.

Figure 7:
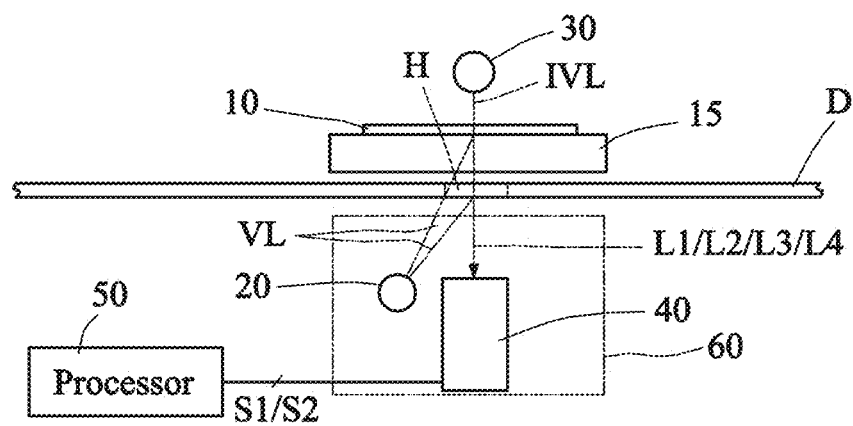
FIG. 7 is a schematic view showing a scanning device of a second modified example of FIG. 1A.

FIG. 7 is a schematic view showing a scanning device of a second modified example of FIG. 1A. Referring to FIG. 7, this modified example is similar to FIG. 1A except for the difference that the multi-mode scanning device 100 further includes a transparent member 15 disposed between the background element 10 and the original D, and between the optical module 40 and the background element 10. The transparent member 15 may be a transparent glass plate, for example, and the background element 10 may have various implementation aspects. For example, the background element 10 is a Mylar bonded or adhered to the transparent member 15, or a coating layer coated on the transparent member 15. Thus, the transparent member 15 can protect the background element 10 from the original's contamination and wearing.

It is worth noting that various implementations of the transparent member 15 and the background element 10 of FIG. 7 may also be properly applied to each of the following examples. In addition, although the tests in FIGS. 3 to 6 are performed using the sheet-fed scanning, they are also applicable to the following flatbed scanning.

Figure 8:
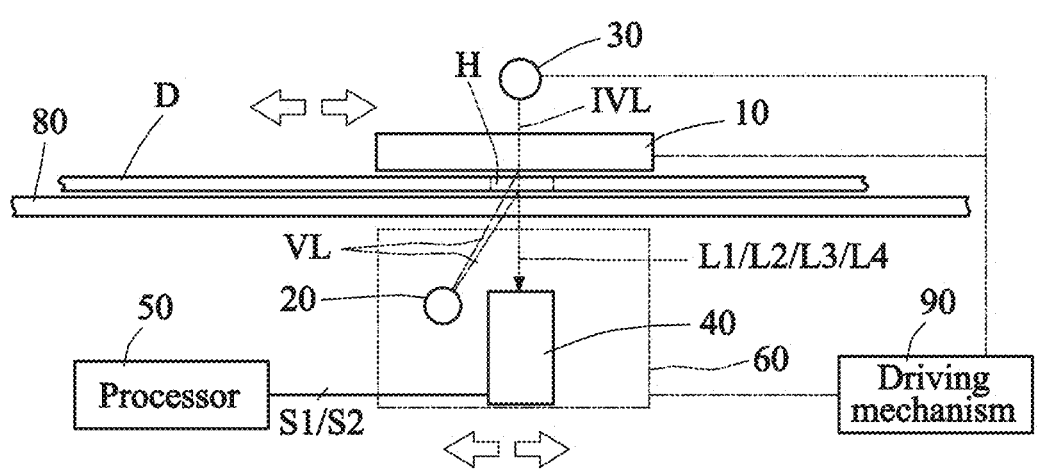
FIG. 8 is a schematic view showing a flatbed scanning device of a third modified example of FIG. 1A.

FIG. 8 is a schematic view showing a flatbed scanning device of a third modified example of FIG. 1A. Referring to FIG. 8, this modified example provides a multi-mode scanning device 100 performing flatbed scanning for scanning the original D, wherein the multi-mode scanning device 100 includes the background element 10, a transparent platen 80, the first light source 20, the second light source 30 and the optical module 40. The transparent platen 80 supports the original D, so that the original D is disposed between the transparent platen 80 and the background element 10. The first light source 20 outputs the visible light VL to irradiate the background element 10 and the original D to generate first light L1 and second light L2, respectively. The second light source 30 outputs the invisible light IVL to irradiate a combination of the background element 10 and the original D to generate third light L3 and fourth light L4. The optical module 40 is movably disposed and receives the first light L1, the second light L2, the third light L3 and the fourth light L4 to generate sensing signals S1. Thus, the visible light information and the contour information representative of the original D can be obtained according to the sensing signals S1. The original D is disposed between the background element 10 and the optical module 40. The first light source 20 and the optical module 40 are disposed on the same side of the background element 10. The optical module 40 and the second light source 30 are disposed on different two sides of the background element 10. In this example, the flatbed scanning can be implemented. The cover range of the background element 10 is greater than or equal to the scan range of the scanning device. The first light source 20, the second light source 30, the optical module 40 and the background element 10 are movable, while the original D is stationary. The first light source 20 and the second light source 30 are linear light sources. In addition, the multi-mode scanning device 100 further includes a driving mechanism 90 which drives the first light source 20, the second light source 30, the optical module 40 and the background element 10 to move relatively to the original D. The background element 10 is separated from the original D by a distance.

Figure 9:
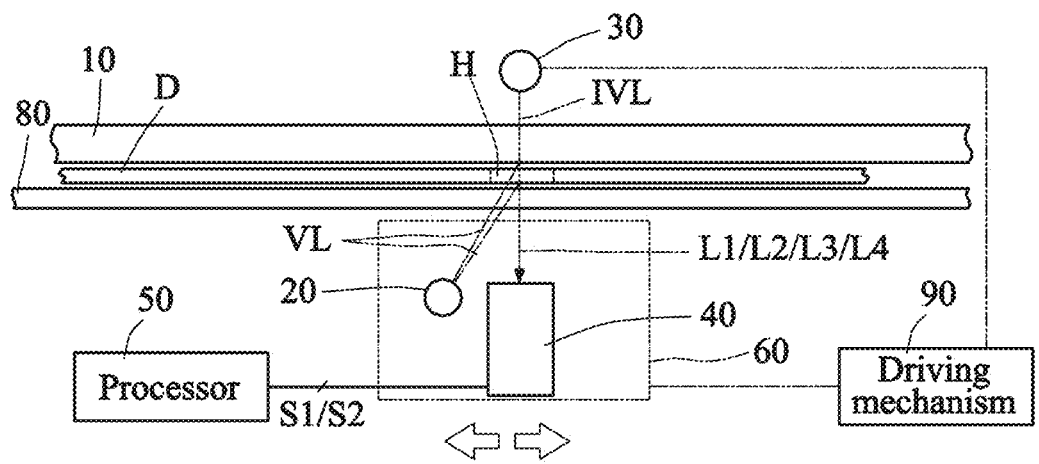
FIG. 9 is a schematic view showing a flatbed scanning device of a fourth modified example of FIG. 1A.

FIG. 9 is a schematic view showing a flatbed scanning device of a fourth modified example of FIG. 1A. Referring to FIG. 9, this example is similar to FIG. 8 except for the difference that the driving mechanism 90 drives the first light source 20, the second light source 30 and the optical module 40 to move relatively to the original D and the background element 10, and the background element 10 presses the original D against the transparent platen 80. In this example, the flatbed scanning can be implemented, wherein the background element 10 presses the original D, the background element 10 and the original D are immovable, and the first light source 20, the second light source 30 and the optical module 40 are movable.

Figure 10:
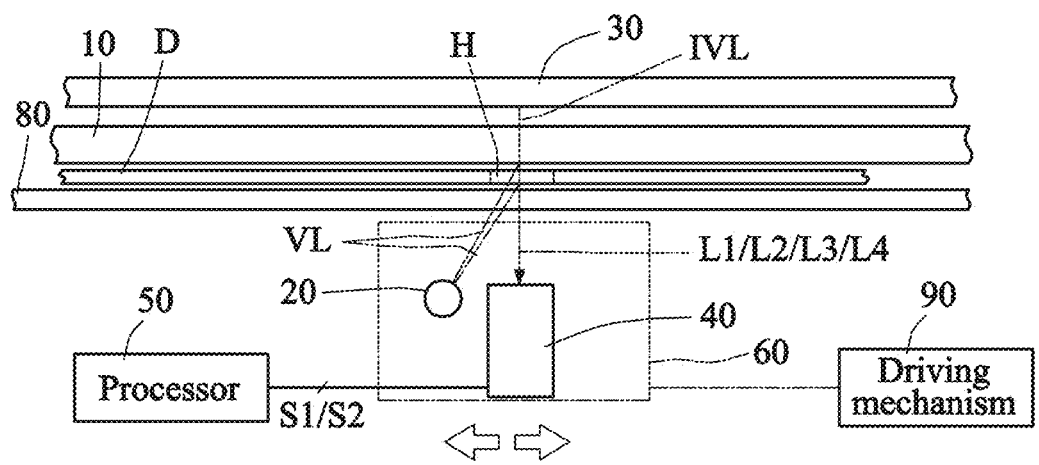
FIG. 10 is a schematic view showing a flatbed scanning device of a fifth modified example of FIG. 1A.

FIG. 10 is a schematic view showing a flatbed scanning device of a fifth modified example of FIG. 1A. Referring to FIG. 10, this example is similar to FIG. 8 except for the difference that the driving mechanism 90 drives the first light source 20 and the optical module 40 to move relatively to the original D and the background element 10, and the background element 10 presses the original D against the transparent platen 80. In this example, the flatbed scanning can be implemented, the first light source 20 and the optical module 40 are movable, the background element 10 and the second light source 30 are immovable, and a flat light source can be used to implement the second light source 30.

Figure 11:
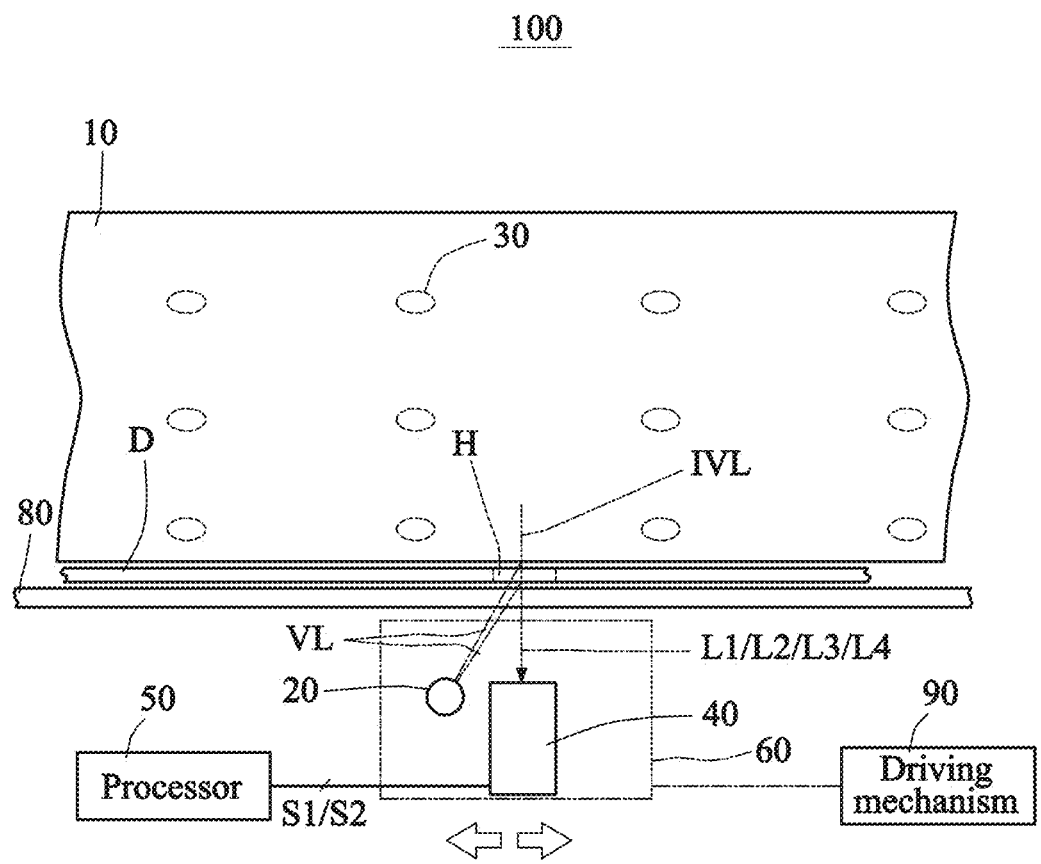
FIG. 11 is a schematic view showing a flatbed scanning device of a sixth modified example of FIG. 1A.
Figure 12:
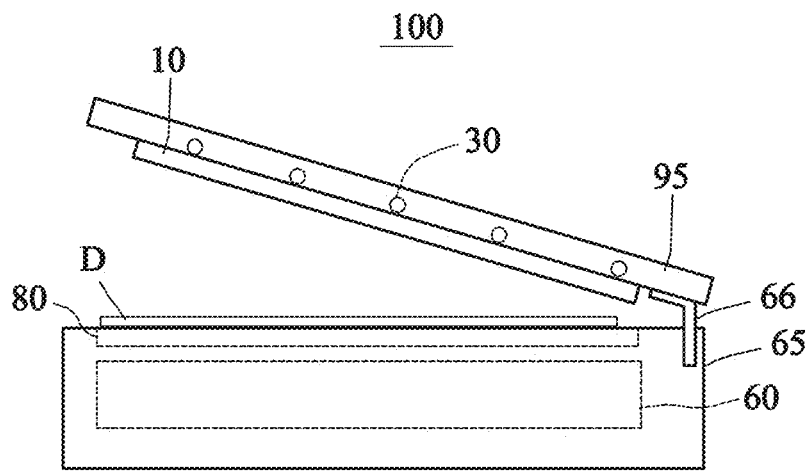
FIG. 12 is a schematic view showing the scanning device of FIG. 11 at another viewing angle.

FIG. 11 is a schematic view showing a flatbed scanning device of a sixth modified example of FIG. 1A. FIG. 12 is a schematic view showing the scanning device of FIG. 11 at another viewing angle. Referring to FIGS. 11 and 12, this example is similar to FIG. 8, in which the background element 10 does not press the original D, except for the difference that the driving mechanism 90 drives the first light source 20 and the optical module 40 to move relatively to the original D and the background element 10. The background element 10 is fixed to an upper cover 95 but does not press the original D, and a non-zero predetermined angle ranging from, for example, 15 to 60 degrees is formed between the background element 10 and the original D. This can be implemented by a hinge 66 connected to a body 65 and the upper cover 95, so that the background element 10 may be locked at the angle. In this case, the processor 50 can obtain the distribution of the brightness of the invisible light in the horizontal direction of FIG. 12 according to a corresponding database (calibration before been shipped out), so that the effect of this disclosure can be achieved. In this example, the flatbed scanning can be implemented, wherein the upper cover 95 is not closed, and the background element 10 and the second light source 30 are immovable. Regarding to the intensity difference of the invisible light caused by the upper cover 95 that is not closed, the calculation can be made according to the predetermined angle to obtain the compensation reference.

With the above-mentioned embodiment, it is possible to provide a multi-mode scanning device performing flatbed scanning to possess the functions of scanning the visible light image of the document, obtaining the invisible light (contour) information using the calibration member, which is necessary for the visible light image, in conjunction with the invisible light source, and even inpainting the image of the hole or the images of the holes. When the prior art is adopted, the background element (more particularly the calibration background element) is not adopted to transmit the invisible light so that the contour information can be acquired. This disclosure overcomes the conventional preconception, and adopts the background element to provide the background reference function and the contour information acquiring function. The background element transmits the invisible light and reflects the visible light. This is advantageous to the technological development of image scanning and image inpainting.

While this disclosure has been described by way of examples and in terms of preferred embodiments, it is to be understood that this disclosure is not limited thereto. To the contrary, it is intended to cover various modifications. Therefore, the scope of the appended claims should be accorded the broadest interpretation so as to encompass all such modifications.

What is claimed is:

1. A multi-mode scanning device for scanning an original, the multi-mode scanning device comprising:
    a background element;
    a transparent platen supporting the original such that the original is disposed between the transparent platen and the background element;
    a first light source outputting visible light to irradiate the background element and the original to generate first light and second light, respectively;
    a second light source outputting invisible light to irradiate a combination of the background element and the original to generate third light and fourth light; and
    an optical module being movably disposed, and receiving the first light, the second light, the third light and the fourth light to generate sensing signals, and thus to obtain visible light information and invisible light information representative of the original according to the sensing signals, wherein the original is disposed between the background element and the optical module, the first light source and the optical module are disposed on a same side of the background element, and the optical module and the second light source are disposed on different sides of the background element.

2. The multi-mode scanning device according to claim 1, further comprising a processor, wherein in a calibration mode, the background element functions as a calibration sheet, the first light source outputs the visible light to irradiate the background element to generate the first light, the optical module receives the first light and thus generates a calibration signal, and the processor performs optical calibration according to the calibration signal.

3. The multi-mode scanning device according to claim 2, wherein the processor determines a contour of the original according to a relation chart of an invisible light intensity representative of the invisible light information versus a pixel index of the optical module, wherein a location where the invisible light intensity has a sharp drop along an axis of the pixel index represents the contour.

4. The multi-mode scanning device according to claim 3, wherein a value of the sharp drop ranges between 110 and 180.

5. The multi-mode scanning device according to claim 2, wherein the processor determines a contour of the original according to a relation chart of both a visible light intensity representative of the visible light information and an invisible light intensity representative of the invisible light information versus a pixel index of the optical module, wherein a location where the invisible light intensity has a sharp drop along an axis of the pixel index, and the visible light intensity has a sharp rise along the axis of the pixel index represents the contour.

6. The multi-mode scanning device according to claim 5, wherein a value of the sharp drop ranges between 110 and 180, and a value of the sharp rise ranges between 40 and 70.

7. The multi-mode scanning device according to claim 5, wherein a difference between a value of the sharp drop and a value of the sharp rise ranges between 40 and 140.

8. The multi-mode scanning device according to claim 1, wherein the invisible light penetrates through a combination of the background element and the original to generate the third light and the fourth light, wherein the invisible light penetrates through the background element and a hole of the original to generate the fourth light, and the invisible light penetrates through the background element and a portion other than the hole of the original to generate the third light.

9. The multi-mode scanning device according to claim 1, further comprising:
a driving mechanism driving the first light source, the second light source, the optical module and the background element to move relatively to the original.

10. The multi-mode scanning device according to claim 1, further comprising:
a driving mechanism driving the first light source, the second light source and the optical module to move relatively to the original and the background element, wherein the background element presses the original against the transparent platen.

11. The multi-mode scanning device according to claim 1, further comprising:
a driving mechanism driving the first light source and the optical module to move relatively to the original and the background element, wherein the background element presses the original against the transparent platen.

12. The multi-mode scanning device according to claim 1, further comprising:
a driving mechanism driving the first light source and the optical module to move relatively to the original and the background element, wherein the background element does not press the original.

13. The multi-mode scanning device according to claim 1, wherein the visible light passes through a hole of the original to irradiate the background element to generate the first light, and the visible light irradiates a portion other than the hole of the original to generate the second light.

14. The multi-mode scanning device according to claim 1, wherein the invisible light sequentially passes through the background element and a hole of the original to generate the fourth light, and the invisible light sequentially penetrates through the background element and a portion other than the hole of the original to generate the third light.

\* \* \* \* \*